United States Patent
Jauquet et al.

(10) Patent No.: US 10,185,309 B2
(45) Date of Patent: Jan. 22, 2019

(54) SYSTEMS AND METHODS FOR RECOMMENDING COMPONENTS FOR AN INDUSTRIAL SYSTEM

(71) Applicant: Rockwell Automation Technologies, Inc., Mayfield Heights, OH (US)

(72) Inventors: John J. Jauquet, Milwaukee, WI (US); Jimi R. Michalscheck, Racine, WI (US); Kelly A. Michalscheck, Racine, WI (US); Jessica L. Korpela, Milwaukee, WI (US); Kyle K. Reissner, Hudson, OH (US); David A. Vasko, Hartland, WI (US); Matthew W. Fordenwalt, Hudson, OH (US); Matthew R. Ericsson, Lyndhurst, OH (US); Andrew Wilber, Franklin, WI (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 493 days.

(21) Appl. No.: 14/870,858

(22) Filed: Sep. 30, 2015

(65) Prior Publication Data
US 2016/0282854 A1 Sep. 29, 2016

Related U.S. Application Data

(60) Provisional application No. 62/139,182, filed on Mar. 27, 2015.

(51) Int. Cl.
*G05B 19/418* (2006.01)
*G05B 19/042* (2006.01)
(Continued)

(52) U.S. Cl.
CPC .......... *G05B 19/4185* (2013.01); *F16K 31/00* (2013.01); *F16K 35/00* (2013.01);
(Continued)

(58) Field of Classification Search
CPC .. G06Q 10/06; G06Q 10/20; G06Q 10/06311; G06Q 10/06315;
(Continued)

(56) References Cited

U.S. PATENT DOCUMENTS 5,737,215 A * 4/1998 Schricker ............... G07C 5/008
700/29
7,311,247 B1 * 12/2007 Lenner ............... G07C 9/00103
235/380
(Continued)

*Primary Examiner* — Darrin D Dunn
(74) *Attorney, Agent, or Firm* — Fletcher Yoder P.C.

(57) ABSTRACT

In one embodiment, a tangible, non-transitory computer-readable medium includes computer instructions stored thereon. The computer instructions, when executed by a processor, may cause the processor to receive historical data associated with placing a machine in an industrial environment offline, to determine one or more recommendations for the machine, one or more parts of the machine, or both based on the historical data, to determine an authority level of one or more users requesting to place the machine offline, and to display the one or more recommendations based on the authority level of the one or more users.

23 Claims, 8 Drawing Sheets

(51) Int. Cl.
  *G05B 19/406* (2006.01)
  *G07C 9/00* (2006.01)
  *F16K 31/00* (2006.01)
  *F16K 35/00* (2006.01)
  *F16K 37/00* (2006.01)
  *H02J 4/00* (2006.01)
  *G06F 17/18* (2006.01)
  *G07C 3/00* (2006.01)

(52) U.S. Cl.
  CPC ........ *F16K 37/0025* (2013.01); *G05B 19/042* (2013.01); *G05B 19/406* (2013.01); *G05B 19/4183* (2013.01); *G05B 19/4184* (2013.01); *G05B 19/41875* (2013.01); *G06F 17/18* (2013.01); *G07C 3/00* (2013.01); *G07C 9/00111* (2013.01); *G07C 9/00309* (2013.01); *G07C 9/00896* (2013.01); *H02J 4/00* (2013.01); *G05B 2219/21147* (2013.01); *G05B 2219/31229* (2013.01); *G05B 2219/32368* (2013.01); *G05B 2219/39251* (2013.01); *G05B 2219/50193* (2013.01); *Y02P 80/11* (2015.11); *Y02P 80/12* (2015.11); *Y02P 90/02* (2015.11); *Y02P 90/10* (2015.11); *Y02P 90/14* (2015.11); *Y02P 90/18* (2015.11); *Y02P 90/22* (2015.11); *Y02P 90/86* (2015.11)

(58) Field of Classification Search
  CPC ......... G06Q 10/06375; G06Q 10/0639; G06Q 10/063114; G06Q 10/06316; G05B 23/0278; G05B 23/0283; Y02P 90/14; Y02P 90/86; Y02P 90/10
  See application file for complete search history.

(56) References Cited

U.S. PATENT DOCUMENTS

| | | | |
|---|---|---|---|
| 8,127,132 B2* | 2/2012 | Andersson | G06F 21/6227 713/161 |
| 9,805,528 B1* | 10/2017 | Toepke | G07C 9/00103 |
| 2002/0143421 A1* | 10/2002 | Wetzer | G06Q 10/06 700/100 |
| 2002/0188494 A1* | 12/2002 | Budnik | F01D 5/005 705/7.13 |
| 2003/0208592 A1* | 11/2003 | Taylor | H04L 41/147 709/224 |
| 2007/0112961 A1* | 5/2007 | Brun | H04L 63/102 709/227 |
| 2009/0065578 A1* | 3/2009 | Peterson | G05B 19/048 235/382 |
| 2010/0332008 A1* | 12/2010 | Knipfer | G05B 19/042 700/103 |
| 2011/0072338 A1* | 3/2011 | Caldwell | G05B 19/41845 715/205 |
| 2012/0245479 A1* | 9/2012 | Ganesh | A61B 5/024 600/508 |
| 2013/0321245 A1* | 12/2013 | Harper | G06F 3/147 345/7 |
| 2014/0283008 A1* | 9/2014 | Daino | G06F 21/6218 726/17 |
| 2015/0364142 A1* | 12/2015 | Sankaranarayanan | G06F 21/32 704/275 |
| 2016/0078403 A1* | 3/2016 | Sethi | G06Q 10/0875 705/26.81 |

* cited by examiner

SYSTEMS AND METHODS FOR RECOMMENDING COMPONENTS FOR AN INDUSTRIAL SYSTEM

CROSS-REFERENCE TO RELATED APPLICATIONS

This application claims priority from and the benefit of U.S. Provisional Application Ser. No. 62/139,182, entitled "Systems and Methods for Exchanging Information Between Devices in an Industrial Automation Environment," filed Mar. 27, 2015, which is hereby incorporated by reference in its entirety.

BACKGROUND

The present disclosure relates generally to industrial automation systems and communication of information within industrial automation systems. To facilitate performing various processes in a facility (e.g., a factory or plant), the industrial automation system may include automation equipment and may utilize a communication architecture that facilitates communication of information between automation equipment and/or with a user.

BRIEF DESCRIPTION

In one embodiment, a tangible, non-transitory computer-readable medium includes computer instructions stored thereon. The computer instructions, when executed by a processor, may cause the processor to receive historical data associated with placing a machine in an industrial environment offline, to determine one or more recommendations for the machine, one or more parts of the machine, or both based on the historical data, to determine an authority level of one or more users requesting to place the machine offline, and to display the one or more recommendations based on the authority level of the one or more users.

In one embodiment, a method may include receiving, via a processor, historical data associated with placing a machine in an industrial environment offline, determining, via the processor, one or more recommendations for the machine, one or more parts of the machine, or both based on the historical data, determining, via the processor, an authority level of one or more users requesting to place the machine offline, and sending, via the processor, the one or more recommendations to the one or more users based on the authority level of the one or more users.

In one embodiment, an electronic device may include a processor that may receive historical data associated with placing a machine in an industrial environment offline, determine one or more recommendations for the machine, one or more parts of the machine, or both based on the historical data, determine an authority level of one or more users. The authority level may grant one or more permissions to perform one or more actions related to the machine. The processor may also display the one or more recommendations based on the authority level of the one or more users.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
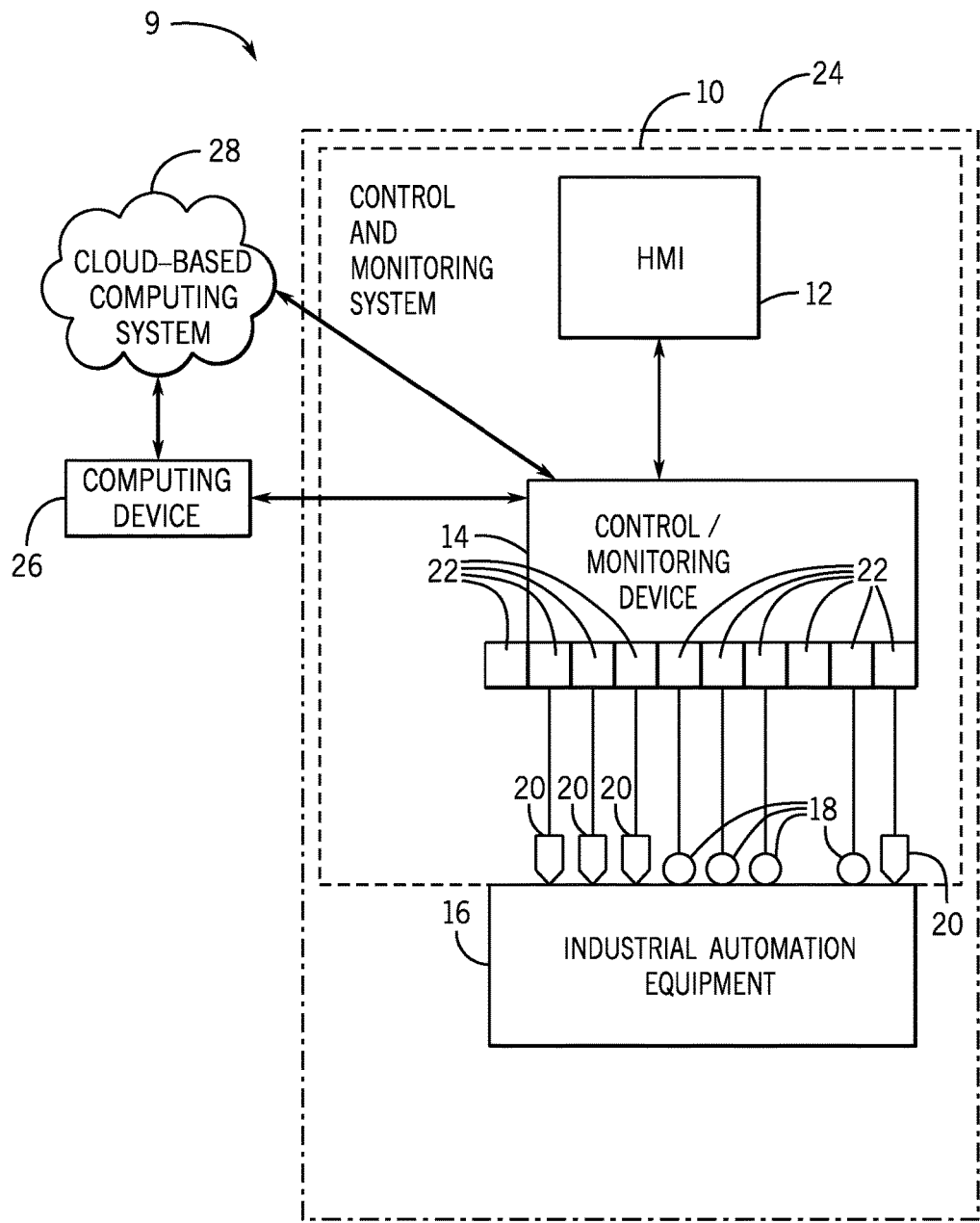
FIG. 1 is a block diagram of an industrial automation system, in accordance with embodiments presented herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As discussed above, industrial automation systems are often used to perform a process in facilities, such as plants or factories. For example, in some embodiments, the process may include a manufacturing process, a steady state process, a batch process, a chemical process, a material handling process, an energy utilizing process, an energy production process, or any combination thereof. Accordingly, the process generally utilizes one or more inputs, such as electrical energy and/or raw materials, to produce one or more outputs, such as manufacturing products and/or byproducts.

To facilitate performing the process, the industrial automation system generally includes various machines and/or devices that perform functions. To simplify the following discussion, the machines and/or devices are generally referred to herein as "industrial automation equipment." To control and monitor the industrial automation equipment, additional devices, such as computing devices, controllers, input/output (I/O) modules, motor control centers, human machine interfaces (HMIs), operator interfaces, contactors, starters, drives, scanners, gauges, valves, flow meters, and the like, may be coupled to the industrial automation equipment.

Since the industrial automation system may include various types of industrial automation equipment, operation of the industrial automation equipment may be interdependent with each other and with various types of control and monitoring equipment. For example, a motor drive may supply electrical power to a motor to actuate the motor. As such, when the motor drive is disabled, the motor may also be disabled.

Thus, to facilitate interoperation, relevant information may be communicated between industrial automation equipment, industrial automation systems, computing devices disposed in the equipment or the industrial automation systems, a computing device unconnected with the equipment or the industrial automation system, users, or any combination thereof. For example, the motor drive may communicate its disabled status (e.g., relevant information) to the motor and/or some computing device to inform others to refrain from reconnecting electrical power. As such, the communication of relevant information with the industrial automation system (e.g., between industrial automation equipment, industrial automation systems, computing devices, and/or users) may facilitate operation and/or maintenance of the industrial automation system.

Accordingly, as will be described in more detail below, the present disclosure provides techniques to facilitate communication of relevant information in an industrial automation system and techniques to facilitate controlling and maintaining operation of the industrial automation system based on the relevant information. In some embodiments, to facilitate the communication of relevant information, the industrial automation system may include a communication architecture that is structured according to a tri-partite structure. More specifically, the tri-partite structure may facilitate communication between industrial automation equipment (or connected industrial automation systems), computing devices (e.g., a mobile computing device or a cloud-based computing system), or any combination thereof. In this manner, the tri-partite structure may facilitate operation and servicing of the industrial automation system by enabling communication of relevant information.

In some embodiments, the relevant information may include data associated with placing the industrial automation equipment offline with or without using certain procedures (e.g., lockout tagout procedures), status information, recommendation information, identification information, and/or operational parameter information. Accordingly, to facilitate controlling/maintaining operation of the industrial automation system, relevant information may be determined and, in some embodiments, presented to a user (e.g., an operator), an administrator, and/or an authorized purchaser. As such, operation and maintenance of the industrial automation system may be facilitated by the determination and/or presentation of the relevant information.

In some embodiments, software may be running on a computing device and the software may track certain procedures (e.g., lockout tagout procedures) used to place the equipment offline. The software may use historical information related to the procedures and other data to provide recommendations for additional or replacement products (e.g., equipment or parts of the equipment). For example, if a particular piece of industrial automation equipment is placed offline a number of times during some period of time, the software may send a recommendation to an authorized purchaser regarding a replacement machine. Moreover, the software may guide the recommendations to users with authority to address the recommendation. In another example, if the historical data indicates that a particular piece of industrial automation equipment is an outlier as compared to similar equipment and has been locked out more than expected or more than other similar industrial automation equipment in the facility, a recommendation including a notice indicating excessive lock outs may be provided to a user with authority to replace the piece of equipment or perform an action on the equipment. The recommendation may include specific machines and/or parts to replace and/or proper product handling information.

Further, the information gathered by the software may be used to provide recommendations for preventative/predictive maintenance. For example, the software may determine a status or an age of a part of a piece of equipment and determine that certain maintenance is due for the component based on the status or the age. In some embodiments, the software may provide a recommendation to the user to perform the maintenance or may schedule the maintenance on an electronic calendar running on the computing device. Further, the software may check the status, such as whether components of the equipment are recalled, obsolete, and/or discontinued, on a regular basis. The software may provide an indication of the recalled, obsolete, and/or discontinued status of the parts associated with the equipment when identified. Additionally, all of the information gathered and/or determined by the software may be provided to a sales force team to customize product offerings for clients. In some embodiments, the information (e.g., industrial automation equipment identity, recommendations, status) may be sent to other electronic devices or displayed in a virtual environment on the computing device.

That is, some embodiments of the present disclosure facilitate presentation of determined relevant information in a virtual environment. In some embodiments, a computing device may display graphical objects on its display to present relevant information to a user. More specifically, the graphical objects may include both real objects and virtual objects disposed in the virtual environment. As used herein, a "real object" may describe a graphical object that depicts a physical feature present in a facility. In some embodiments, the real objects may be based at least in part on image data capturing the physical feature. Additionally, as used herein, a "virtual object" is intended to describe a graphical object that is not physically present in the facility. That is, the virtual object may indicate information relevant to a displayed real object. In some embodiments, the virtual objects may be based at least in part on relevant information determined or received from another computing device, automation equipment, a user, or any combination thereof.

To help illustrate, in some embodiments, a computing device including an image capture feature (e.g., camera) may be moved around the facility to capture a visual representation of a motor (e.g., industrial automation equipment) as image data. Based on the image data, the computing device may display a real object corresponding to the industrial automation equipment to visually represent the industrial automation equipment to its user.

Additionally, the computing device may determine a status, such as whether a component of the industrial automation equipment is discontinued, recalled, and/or obsolete, of the industrial automation equipment. In some embodiments, the computing device may receive the status information from a cloud-based computing system (e.g., a computing device) based on the captured image data. Additionally, in some embodiments, the computing device may search for a status of the component using a serial number or the like over a network (e.g., Internet). The computing device may then display a virtual object that includes text, color, and/or graphics indicating the industrial automation equipment identity, associated recommendations, and/or status. As such, the computing device may present information relevant to the motor when the computing device is located proximate and oriented toward the component such that the image data is captured. In this manner, the computing device may facilitate presentation of relevant information, for example, by leveraging the location and/or orientation of the computing device relative to physical features in a facility.

In some embodiments, the software may identify the user that is operating the software on the computing device. The software may use certain recognition technology (e.g., facial recognition software or scanner) and verify that the appropriate user is performing assigned tasks with the computing device. For example, some users may have the authority to modify the procedures, while other users only have the authority to perform the procedures. To that end, the software may determine the level of authority of the recognized user and enable/disable certain functionality of the software on the computing device accordingly.

FIG. 1 is a diagrammatical representation of an exemplary industrial automation system 9, in accordance with embodiments presented herein. In FIG. 1, the industrial automation system 9 includes a control and monitoring system 10, which is illustrated as including a human machine interface (HMI) 12 and a control/monitoring device (e.g., automation controller, PLC) 14 adapted to interface with devices that may monitor and control various types of industrial automation equipment 16. In some embodiments, the industrial automation equipment 16 may include automation equipment used in an industrial setting. It should be noted that such an interface in accordance with embodiments of the present techniques may be facilitated by the use of certain network strategies. Indeed, an industry standard network may be employed, such as EtherNet/IP® or DeviceNet®, to enable data transfer. Such networks permit the exchange of data in accordance with a predefined protocol, and may provide power for operation of networked elements.

The industrial automation equipment 16 may take many forms and include devices for accomplishing many different and varied purposes. For example, the industrial automation equipment 16 may include machinery used to perform various operations in a compressor station, an oil refinery, a batch operation for making food items, a mechanized assembly line, and so forth. Accordingly, the industrial automation equipment 16 may comprise a variety of operational components, such as electric motors, valves, actuators, temperature elements, pressure sensors, or a myriad of machinery or devices used for manufacturing, processing, material handling, and other applications.

Additionally, the industrial automation equipment 16 may be used to perform the various operations that may be part of an industrial application. For instance, the industrial automation equipment 16 may include electrical equipment, hydraulic equipment, compressed air equipment, steam equipment, mechanical tools, protective equipment, refrigeration equipment, power lines, hydraulic lines, steam lines, and the like. Some example types of equipment may include mixers, machine conveyors, tanks, skids, specialized original equipment manufacturer machines, and the like. In addition to the equipment described above, the industrial automation equipment 16 may also include controllers, input/output (I/O) modules, motor control centers, motors, human machine interfaces (HMIs), operator interfaces, contactors, starters, sensors 18, actuators 20, drives, relays, protection devices, switchgear, compressors, sensor, actuator, firewall, network switches (e.g., Ethernet switches, modular-managed, fixed-managed, service-router, industrial, unmanaged, etc.) and the like.

In certain embodiments, one or more properties of the industrial automation equipment 16 may be monitored and controlled by certain equipment for regulating control variables used to operate the industrial automation equipment 16. For example, sensors 18 and actuators 20 may monitor various properties of the industrial automation equipment 16 and may adjust operations of the industrial automation equipment 16, respectively.

In some cases, the industrial automation equipment 16 may be associated with devices used by other equipment. For instance, scanners, gauges, valves, flow meters, and the like may be disposed on industrial automation equipment 16. Here, the industrial automation equipment 16 may receive data from the associated devices and use the data to perform their respective operations more efficiently. For example, a controller (e.g., control/monitoring device 14) of a motor drive may receive data regarding a temperature of a connected motor and may adjust operations of the motor drive based on the data.

In certain embodiments, the industrial automation equipment 16 may include a computing device and/or a communication component that enables the industrial equipment 16 to communicate data between each other and other devices. The communication component may include a network interface that may enable the industrial automation equipment 16 to communicate via various protocols such as EtherNet/IP, ControlNet, DeviceNet, or any other industrial communication network protocol. Alternatively, the communication component may enable the industrial automation equipment 16 to communicate via various wired or wireless communication protocols, such as Wi-Fi, mobile telecommunications technology (e.g., 2G, 3G, 4G, and LTE), Bluetooth®, near-field communications technology, and the like.

The sensors 18 may be any number of devices adapted to provide information regarding process conditions. The actuators 20 may include any number of devices adapted to perform a mechanical action in response to a signal from a controller (e.g., the automation controller). The sensors 18 and actuators 20 may be utilized to operate the industrial automation equipment 16. Indeed, they may be utilized within process loops that are monitored and controlled by the control/monitoring device 14 and/or the HMI 12. Such a process loop may be activated based on process inputs (e.g., input from a sensor 18) or direct operator input received through the HMI 12. As illustrated, the sensors 18 and actuators 20 are in communication with the control/monitoring device 14. Further, the sensors 18 and actuators 20 may be assigned a particular address in the control/monitoring device 14 and receive power from the control/monitoring device 14 or attached modules.

Input/output (I/O) modules 22 may be added or removed from the control and monitoring system 10 via expansion slots, bays or other suitable mechanisms. In certain embodiments, the I/O modules 22 may be included to add functionality to the control/monitoring device 14, or to accommodate additional process features. For instance, the I/O modules 22 may communicate with new sensors 18 or actuators 20 added to monitor and control the industrial automation equipment 16. It should be noted that the I/O modules 22 may communicate directly to sensors 18 or actuators 20 through hardwired connections or may communicate through wired or wireless sensor networks, such as Hart or IOLink.

Generally, the I/O modules 22 serve as an electrical interface to the control/monitoring device 14 and may be located proximate or remote from the control/monitoring device 14, including remote network interfaces to associated systems. In such embodiments, data may be communicated with remote modules over a common communication link, or network, wherein modules on the network communicate via a standard communications protocol. Many industrial controllers can communicate via network technologies such as Ethernet (e.g., IEEE802.3, TCP/IP, UDP, EtherNet/IP, and so forth), ControlNet, DeviceNet or other network protocols (Foundation Fieldbus (H1 and Fast Ethernet) Modbus TCP, Profibus) and also communicate to higher level computing systems.

In the illustrated embodiment, several of the I/O modules 22 are configured to transfer input and output signals between the control/monitoring device 14 and the industrial automation equipment 16. As illustrated, the sensors 18 and actuators 20 may communicate with the control/monitoring device 14 via one or more of the I/O modules 22 coupled to the control/monitoring device 14.

In certain embodiments, the control/monitoring system 10 (e.g., the HMI 12, the control/monitoring device 14, the sensors 18, the actuators 20, the I/O modules 22) and the industrial automation equipment 16 may make up an industrial application 24. The industrial application 24 may involve any type of industrial process or system used to manufacture, produce, process, or package various types of items. For example, the industrial applications 24 may include industries such as material handling, packaging industries, manufacturing, processing, batch processing, and the like.

In certain embodiments, the control/monitoring device 14 may be communicatively coupled to a computing device 26 and a cloud-based computing system 28. In this network, input and output signals generated from the control/monitoring device 14 may be communicated between the computing device 26 and the cloud-based computing system 28.

Figure 2:
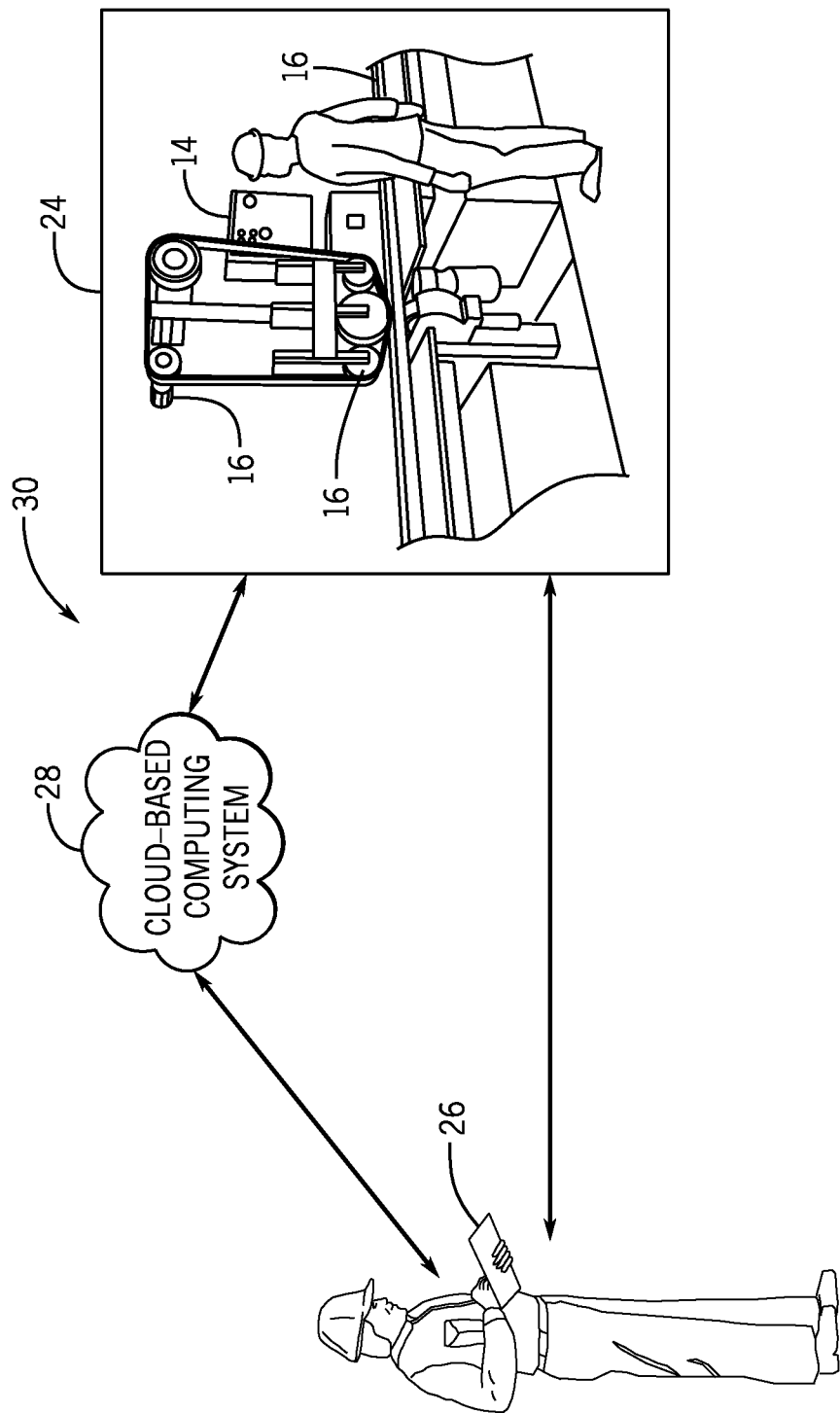
FIG. 2 is a schematic representation of a communication network, in accordance with embodiments presented herein.

FIG. 2 is a schematic representation of a communication network 30 that enables devices to communicate with each other within an industrial application, in accordance with embodiments presented herein. As such, the communication network 30 enables devices that are part of the industrial application 24 to communicate with each other and with other devices that are not part of the industrial application 24. As mentioned above, the industrial application 24 may be in the material handling, packaging industries, manufacturing, processing, batch processing, or any technical field that employs the use of the industrial automation equipment 16.

With the foregoing in mind, in one embodiment, data acquired by the industrial automation equipment 16 may be transmitted to a computing device 26. The computing device 26 may be a computing device that may include communication abilities, processing abilities, and the like. For example, the computing device 26 may be any general computing device that may monitor, control, and/or operate one or more of the industrial automation equipment 16. As such, the computing device 26 may be a laptop computer, a tablet computer, a mobile phone device computing device, a general personal computer, a wearable computing device, or the like. Additional details regarding the computing device 26 will be discussed below with reference to FIG. 3.

In addition to communicating with the industrial automation equipment 16, the computing device 26 may also communicate with the cloud-based computing system 28. The cloud-based computing system 28 may be a cloud-accessible platform that may include one or more servers, one or more computing devices (e.g., general purpose computers), and the like. In any case, the cloud-based computing system 28 may include a number of computers that may be connected through a real-time communication network, such as the Internet, Ethernet, EtherNet/IP, ControlNet, or the like, such that the multiple computers may operate together as a single entity. The real-time communication network may include any network that enables various devices to communicate with each other at near real-time or such that data is communicated with each other at near instantaneous speeds. In one embodiment, the cloud-based computing system 28 may be capable of communicating with the industrial automation equipment 16 and the computing device 26. As such, the cloud-based computing system 28 may be capable of wired or wireless communication between the industrial automation equipment 16 and the computing device 26. In one embodiment, the cloud-based computing system 28 may be accessible via the Internet or some other network.

After establishing a communication connection between the computing device 26 and the industrial automation equipment 16 (e.g., via an associated control/monitoring device 14 or computing device of the industrial automation equipment 16), the cloud-based computing system 28 may receive data acquired by the computing device 26 and the industrial automation equipment 16. After receiving this data, in one embodiment, the cloud-based computing system 28 may perform large-scale data analysis operations on the data, such that the operations may be distributed over the computers that make up the cloud-based computing system 28.

In another embodiment, the cloud-based computing system 28 may forward acquired data or analyzed data to different computing devices, various industrial automation equipment 16, or the like. As such, the cloud-based computing system 28 may maintain a communication connection with various industrial automation equipment 16, computing devices 26, and the like. Additional details regarding the cloud-based computing system 28 will be discussed below with reference to FIG. 4.

Figure 3:
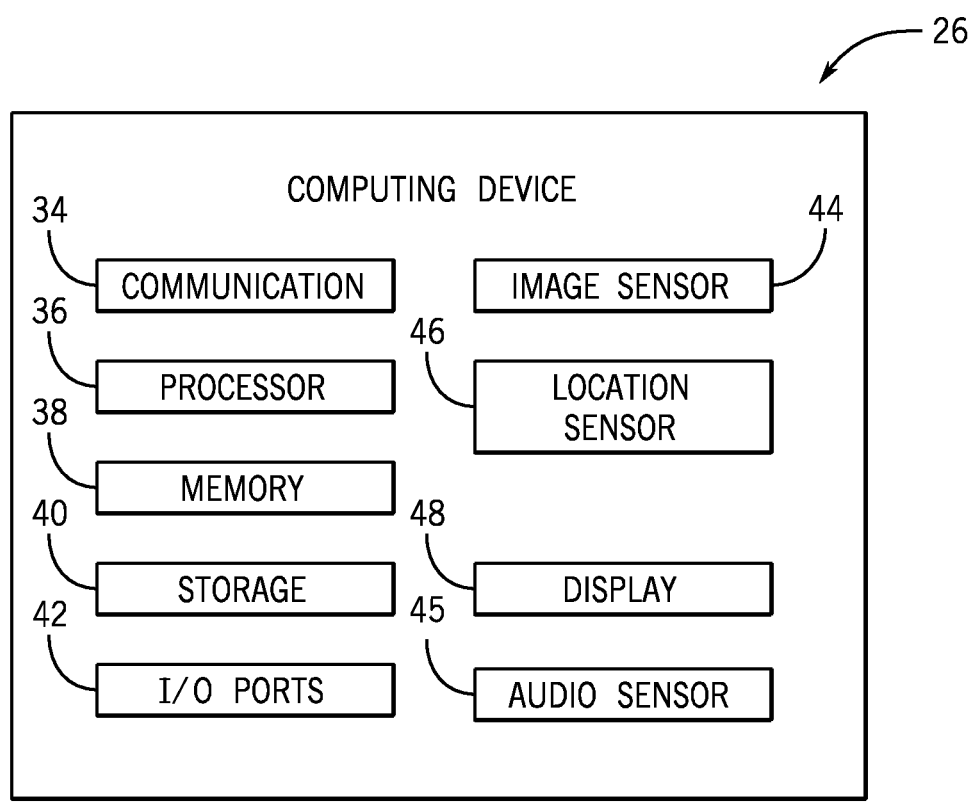
FIG. 3 is a block diagram of a computing device, in accordance with embodiments presented herein.

FIG. 3 is a block diagram of a computing device, in accordance with embodiments presented herein. As depicted, the computing device 26 includes a communication component 34, a processor 36, a memory 38, a storage component 40, and input/output (I/O) ports 42. Some embodiments of the computing device 26 may also have an image sensor (e.g., a camera, scanner) 44, an audio sensor 45, a location sensor 46, and a display 48.

In some embodiments, the communication component 34 may enable communicatively coupling the computing device 26 to the communication network 30, for example, via a wired and/or a wireless connection. More specifically, the communication component 34 may convert data in accordance with a network protocol used by the communication network 30 and transmit the data over the communication network 30. Additionally, the communication component 34 may receive data from the communication network 30 and interpret the data based on the network protocol.

Additionally, the processor 36 may execute instructions and/or operate on data stored in the memory 38 and/or the storage component 40. As such, the processor 36 may include any type of processing circuitry (e.g., a computer processor or microprocessor) capable of executing computer-executable instructions. In certain embodiments, the processor 34 may include multiple processors working together. Additionally, the memory 38 may be any suitable tangible, non-transitory computer-readable medium (e.g., an article of manufacture) capable of storing computer-executable instructions and/or data.

More specifically, in some embodiments, the processor 36 may execute instructions to provide software applications that enable tracking and/or monitoring of the operation of the industrial automation equipment 16 and thus the industrial automation system 9. In some embodiments, the software applications may audit historical data related to procedures (e.g., lockout tagout procedures) used to place the industrial automation equipment 16 offline and the processor 36 may determine one or more recommendations to present to the user via the software applications. For example, in such instances, the software application may present the recommendations as virtual objects overlayed on real objects of the industrial automation equipment 16 displayed in a virtual environment. Similarly, the processor 36 may determine when certain components of the industrial automation equipment 16 are recalled and/or discontinued and can send a recommendation including a notice to an authorized user or display the information as virtual objects in the virtual environment.

Additionally, in some embodiments, the processor 36 may execute instructions to provide software applications that enable controlling operation of the industrial automation equipment 16. For example, in such instances, the software applications may determine a control instruction to perform a control action. The software applications may then communicate the control instruction to the industrial automation equipment 16, thereby instructing the industrial automation equipment 16 to perform the control action. In some embodiments, the control instruction may be determined by the computing device 26 and/or input by a user.

To enable communicating with the user, the I/O ports 42 may couple the computing device 26 to peripheral components. For example, the I/O ports 42 may interface with input devices, such as a keyboard, a mouse, buttons, or the HMI 12, which enable a user to input instructions to the computing device 26. Additionally, in some embodiments, the display 48 may be touch sensitive, which may enable a user to input instructions by interacting with the display 48. For example, a user may select a button graphical object (e.g., a virtual object) on the display 48 to instruct the industrial automation system 9 to perform a particular operation. In this manner, the user may input instructions that instruct the industrial automation system 9, for example, to determine relevant information (e.g., identity information, recommendation information, status information), perform a particular control action, execute a procedure (e.g., an audit procedure, a lockout-tagout procedure, a device offline procedure, a component replacement procedure, or a service/maintenance procedure), or the like.

In addition to enabling user inputs, the display 48 may also present (e.g., provide) visualizations (e.g., graphical objects) associated with a software application. In some embodiments, the display 48 may display information relevant to the industrial automation equipment 16 as a graphical object. For example, the display 48 may display recommendations and/or status information of the industrial automation equipment 16 as a graphical object (e.g., a virtual object). In this manner, the display 48 may enable alerting users of recommended actions to take related to the industrial automation equipment 16. As such, the display 48 may be any suitable type of display, such as a liquid crystal display (LCD), a plasma display, or an organic light emitting diode (OLED) display. As will be described in more detail below, the display 48 may enable relevant information to be displayed to indicate an association with the industrial automation equipment 16. For example, relevant information (e.g., recommendations, statuses) may be displayed as text (e.g., a virtual object) adjacent a visual representation of corresponding industrial automation equipment 16 (e.g., a real object).

To facilitate capturing the real object, the computing device 26 may also include an image sensor 44, such as a digital camera or other image acquisition circuitry. More specifically, the image sensor 44 may be capable of capturing a visual representation of surrounding physical features, for example, as image data. As will be described in more detail below, visual representations of a portion of the facility may be transmitted to another computing device 26 to enable remotely and/or automatically identifying the industrial automation equipment 16 and/or providing other relevant information.

Additionally, the computing device 26 may also include an audio sensor 45, such as a microphone. More specifically, the audio sensor 45 may be capable of capturing a digital representation of surrounding sounds, for example, as audio data. As will be described in more detail below, audio representations of a portion of the facility may be transmitted to another computing device 26 to enable remotely and/or automatically identifying an industrial automation equipment 16 and/or providing other relevant information.

In some embodiments, the relevant information may be provided to the computing device 26 based at least in part on location of the computing device 26 and/or proximity to the industrial automation equipment 16. Accordingly, the computing device 26 may include a location sensor 46, such as a global positioning system (GPS) sensor, a radio frequency transceiver, an infrared sensor, and the like. In some embodiments, the location sensor 46 may enable the computing device 26 to determine and provide information relevant to particular industrial automation equipment 16 once the computing device 26 is within a certain distance from the particular industrial automation equipment 16.

Although the components described above have been discussed with regard to the computing device 26, it should be noted that similar components may be used in the automation controller 14 and the like. Moreover, the listed components are provided as example components and the embodiments described herein are not to be limited to the components described with reference to FIG. 3. More specifically, the components included in each computing device 26 may be dependent on desired functionality of the computing device 26. For example, since a mobile computing device 26 may be deployed in closer proximity to the industrial automation equipment 16, the mobile computing device 26 may include various other sensors, such as an accelerometer or a gas sensor, to provide additional information related to its surrounding environment. Further, it should be noted again that the computing device 26 may be present within the industrial automation equipment 16 to monitor and control the operation of the industrial automation equipment 16, as well as to participate in the communication network 30.

Additionally, a cloud-based computing system 28 may facilitate automated distribution of relevant information to one or more other computing devices 26. More specifically, in some embodiments, the cloud-based computing system 28 may receive data acquired by other computing devices 26 and/or the industrial automation equipment 16. After receiving this data, in some embodiments, the cloud-based computing system 28 may perform large-scale data analysis operations on the data. Additionally, the cloud-based computing system 28 may forward the acquired data and/or analyzed data to one or more other computing devices 26, the automation controller 14, one or more industrial automation equipment 16, or the like. As such, the cloud-based computing system 28 may include an expanded storage component 40 to store large amounts of data, an expanded processor component 36 to facilitate large-scale data analysis, and/or a communication component 34 that enables serving data to multiple computing devices 26.

Figure 4:
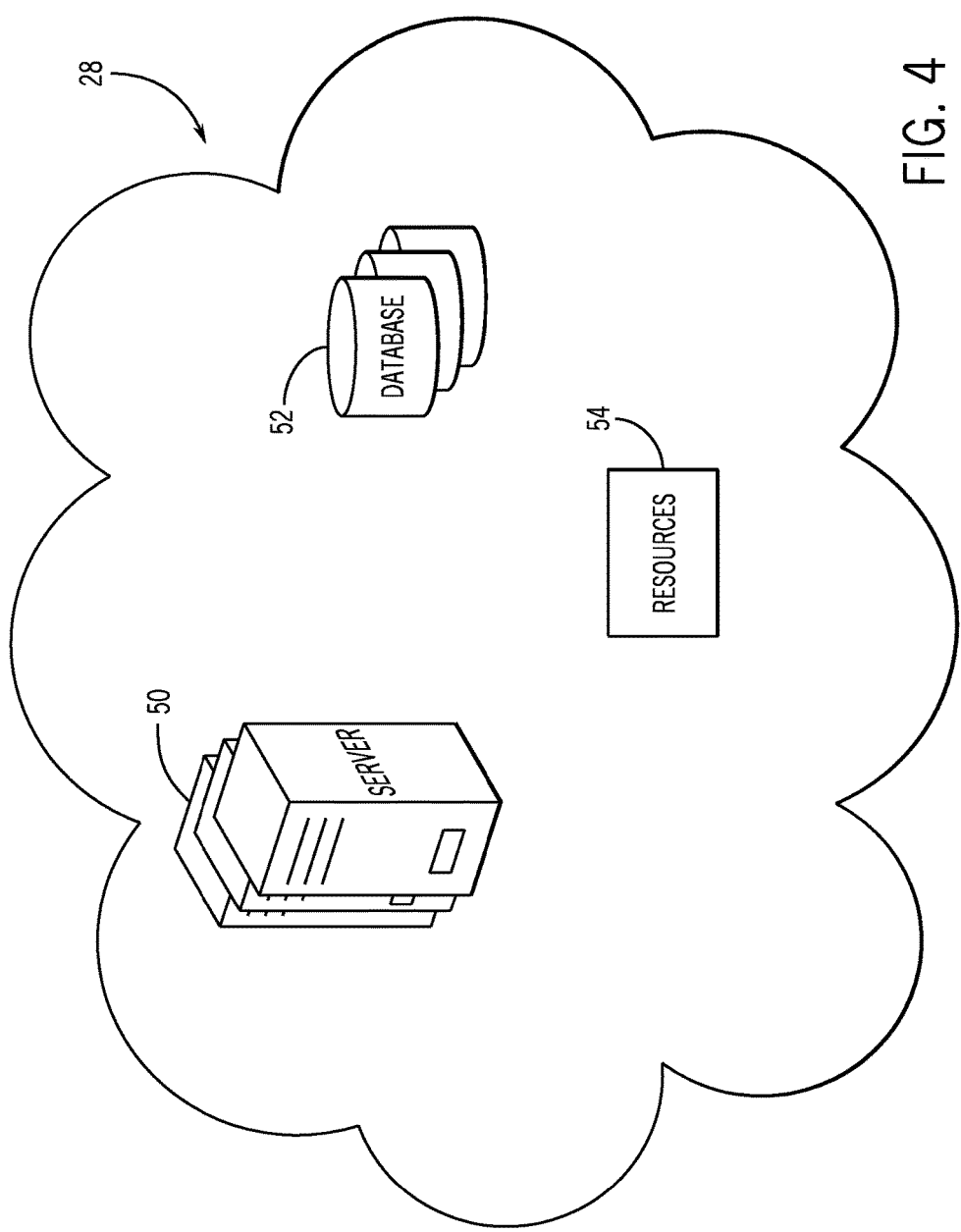
FIG. 4 is a block diagram a cloud-based computing system, in accordance with embodiments presented herein.

FIG. 4 is a block diagram a cloud-based computing system, in accordance with embodiments presented herein. As depicted, the cloud-based computing system 28 includes a server 50, a database 52, and resources 54. More specifically, in some embodiments, the server 50 may communicatively couple the cloud-based computing system 28 to one or more other computing devices 26 to enable distribution of tasks and thereby facilitate processing efficiency. In this manner, the server 50 may facilitate complex computations, such as large-scale data analysis.

Additionally, the database 52 may store information relevant to various aspects of the industrial automation system 9, the industrial automation equipment 16, computing devices 26, operators, and the like. More specifically, the relevant information stored in the database may facilitate automated determination of an identity of the industrial automation equipment 16, status information related to the industrial automation equipment 16, facility status, procedure instructions, assessments (e.g., recommendation) information, or any combination thereof.

For example, the database 52 may store an association between identifying information and identity of the industrial automation equipment 16. Additionally, the database 52 may store procedure instructions steps, tools/safety equipment to use, documentation requirements, and the like to facilitate providing procedure instructions. Furthermore, the database 52 may store desired operation of the industrial automation equipment 16, correspondence between undesired operation and likely causes, replacement part correspondence, regulations, associated costs, contact information for service professionals, recommendation instructions, status information related to components of the industrial automation equipment 16, and the like to facilitate providing recommendation information for the industrial automation equipment 16 and/or price quotes on the recommendation. The database 52 may also store other information related to the industrial automation equipment 16, such as warranty information, service contract information, operating manuals, part equivalences, update information, and other information that may be useful to an operator.

In this manner, as will be described in more detail below, the database 52 may facilitate determining information relevant to other computing devices 26, the industrial automation equipment 16, and/or users. For example, the cloud-based computing system 28 may search the database 52 using received identifying information to determine the identity of the industrial automation equipment 16. Additionally, based on the identity of the industrial automation equipment 16, the cloud-based computing system 28 may search the database 52 to provide recommendation information (e.g., service recommendations, part recommendation, price quotes).

In some embodiments, the cloud-based computing system 28 may also include access to resources 54. More specifically, the resources 54 may be a collection of published documents or webpages containing information that may be relevant to the industrial automation system 9, the industrial automation equipment 16, environmental conditions, and the like. For example, the resources 54 may include information regarding product recalls for the industrial automation equipment 16, weather advisory notices for the area around the facility, and the like. As such, in some embodiments, the resources 54 may be accessed by the cloud-based computing system 28 via a communication network, such as the Internet.

As will be described in more detail below, the resources 54 may provide additional context for determining relevant information. For example, when a recall for the industrial automation equipment 16 is determined via the resources 54, the cloud-based computing system 28 may determine replacement part recommendations and/or location of the recalled industrial automation equipment 16. Additionally, when a weather advisory for the area around the facility is determined via the resources 54, the cloud-based computing system 28 may determine lockout-tagout (LOTO) procedure instructions to disconnect portions of the industrial automation system 9 that may be affected by inclement weather.

Figure 5:
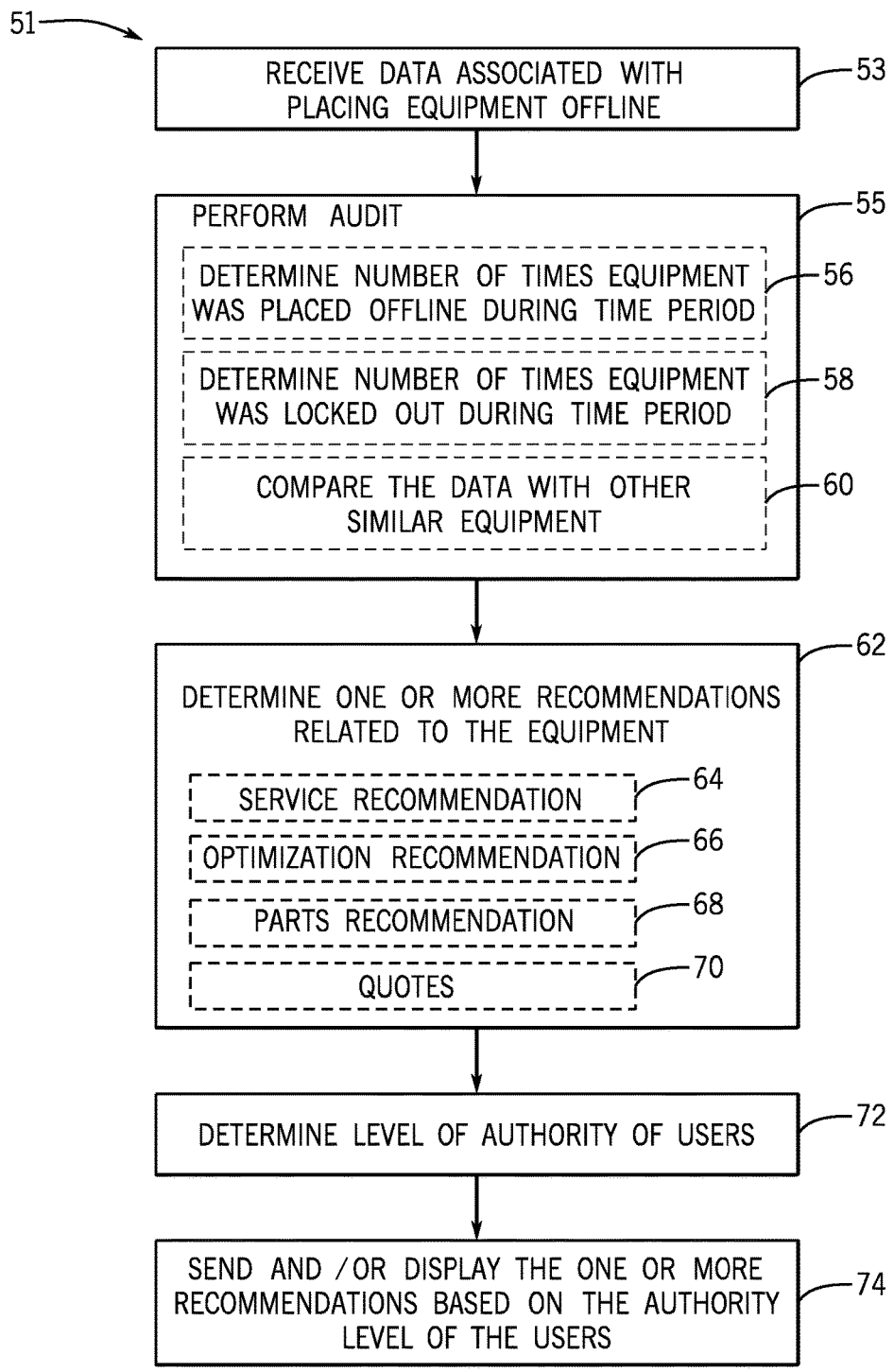
FIG. 5 is a flow diagram of a method for determining recommendations based on historical data, in accordance with embodiments presented herein.

FIG. 5 is a flow diagram of a method 51 for determining recommendations based on historical data, in accordance with embodiments presented herein. The method 51 may be implemented as computer instructions stored on the one or more tangible, non-transitory computer-readable mediums (e.g., memories 38) and executable by the one or more processors 36. Although the following description of the method 51 is provided with reference to the processor 36 of the computing device 26, it should be noted that the method 51 may be performed by one or more other processors 51 disposed on other devices that may be capable of communicating with the cloud-based computing system 28, the control/monitoring device 14, the industrial automation equipment 16, or other components associated with the industrial application 24. Additionally, although the following method 51 describes a number of operations that may be performed, it should be noted that the method 51 may be performed in a variety of suitable orders and all of the operations may not be performed. It should be appreciated that the method 51 may be wholly executed by the computing device 26 (e.g., tablet) or the execution may be distributed between the cloud-based computing system 28 and the computing device 26.

Referring now to the method 51, the processor 36 may receive (block 53) data associated with placing the industrial automation equipment 16 offline. The data may include historical dates and times the industrial automation equipment 16 was placed offline, historical dates and times the industrial automation equipment 16 was locked out and tagged out, sensor readouts associated with the time period when the industrial automation equipment 16 was placed offline, identification information for the industrial automation equipment 16, and so forth. The identification information may be received by the processor 36 as image data including a visual representation of the industrial automation equipment 16 captured by the image sensor 44, as audio data including an audio representation of the industrial automation equipment 16 captured by the audio sensor 45, or as alphanumeric identifier received from a transmitter (e.g., near-field communication (NFC) transmitter) of the industrial automation equipment 16. Accordingly, in some embodiments, the computing device 26 may capture identification information (e.g., image data or audio data) corresponding with the industrial automation equipment 16 via its image sensor 44 and/or audio sensor 45. Additionally, in some embodiments, the computing device 26 may receive the identification information (e.g., unique identifier) corresponding with the industrial automation equipment 16 from the industrial automation equipment 16 or from a computing device disposed within the industrial automation equipment 16 via a NFC transmitter. In some embodiments, the processor 36 may perform object recognition techniques to identify the industrial automation equipment 16 using the image and/or audio data.

The processor 36 may perform (block 55) an audit for the identified industrial automation equipment 16 using the received data. In some embodiments, performing an audit may include determining (block 56) a number of times the industrial automation equipment 16 was placed offline during a certain time period, determining (block 58) a number of times the industrial automation equipment 16 was locked out during a certain time period, and/or comparing (block 60) the data with other historical data for other similar industrial automation equipment 16 located in the same and/or different facility. The historical data associated with placing the industrial automation equipment 16 offline may be available via databases 52 or the like.

In some embodiments, the processor 36 may detect overlapping shut downs of industrial automation equipment 16 to determine a root cause for placing a particular piece of industrial automation equipment 16 offline. In some embodiments, a matrix of the facility may be maintained that represents the connections between industrial automation equipment 16 in the facility and reasons for placing each industrial automation equipment 16 offline. The reasons may indicate that the industrial automation equipment 16 was placed offline because of a property (e.g., excess temperature, vibration, or the like) unique to itself or as a step in a process to place upstream or downstream industrial automation equipment 16 offline. For example, a particular piece of industrial automation equipment 16 may be placed offline more than a threshold number of times within a certain time period as a result of upstream or downstream industrial automation equipment 16 being placed offline. In such a scenario, the upstream or downstream equipment may be experiencing one or more issues (e.g., excess temperature, vibrations, or the like) that triggers placing the upstream or downstream equipment offline. However, to properly place the upstream or downstream equipment offline, the particular piece of industrial automation equipment 16 may be placed offline in a defined order (e.g., first), which may suggest a correlation to fault. Thus, the processor 36 may determine that the upstream or downstream equipment is the root cause of placing the particular piece of industrial automation equipment 16 more than desired. As such, the processor 36 may determine that the particular piece of industrial automation equipment 16 is in satisfactory condition even though it is being placed offline more than the desired amount of times.

Based on the results of the determination and/or comparison, the processor 36 may determine (block 62) one or more recommendations related to the industrial automation equipment 16 based on one or more factors. For example, when the number of times the industrial automation equipment 16 was placed offline within the certain time period is more than a threshold amount, then the processor 36 may generate one or more recommendations (e.g., replace or service the industrial automation equipment 16). Also, when the number of times the industrial automation equipment 16 was locked out is more than an expected amount (e.g., threshold amount), then the processor 36 may generate one or more recommendations. Further, when comparing the data with a second set of data associated with placing one or more similar pieces of industrial automation equipment 16 offline indicates that the industrial automation equipment 16 being analyzed has been placed offline or locked out more than the other industrial automation equipment 16, then the processor 36 may generate one or more recommendations. In some embodiments, the amount of time or the number of times the other industrial automation equipment 16 is placed offline or locked out may be averaged and the data associated with the industrial automation equipment 16 being analyzed may be compared to the average. When the processor 36 determines that the industrial automation equipment 16 is placed offline or locked out more (e.g., for a longer amount of time or a greater number of times) than the average, the processor 36 may determine the industrial automation equipment 16 is an outlier and generate one or more recommendations. It should be noted that the thresholds may be learned by the processor 36 based on historical data related to the number of times the industrial automation equipment 16 is placed offline or locked out, the number of times other similar equipment 16 is placed offline or locked out, or the like. It should be noted that present embodiments may provide for feedback from users with respect to recommendations. For example, recommendations in general or recommendations related to specific industrial automation equipment 16 may be disabled or the frequency of such recommendations adjusted.

The one or more recommendations may include service recommendations (block 64) (e.g., changing oil, tuning a motor, tightening fasteners, cleaning components) to maintain or troubleshoot operation of the industrial automation equipment 16, optimization recommendations (block 66) (e.g., installing a software update with an algorithm in the control/monitoring device 14 that increases production and/or reduces energy consumption of the equipment 16) for improving operation of the associated industrial automation equipment 16, and/or parts recommendations (block 68) (e.g., replace a conveyor belt, motor, switch, contactor, relay, cog, fastener, or the like after a certain amount of use) for use in the industrial automation equipment 16. Moreover, the processor 36 may determine an estimated quote (block 70) for implementing any of the recommendations. The quote may include parts requirements, parts costs, service costs, labor costs, and the like. The processor 36 may determine the quote by searching a product catalog stored in the memory 38, querying a remote database 52, searching the Internet, and/or requesting the information from the cloud-based computing system 28. The quote may also be determined in view of warranty information as per the database.

The processor 36 may then determine an authority level (block 72) of the user operating the computing device 26, other users operating computing devices 26 in communication with the computing device 26, or the like. In some embodiments, the one or more users may be requesting to place the industrial automation equipment 16 offline. The processor 36 may send and/or display (block 74) the one or more recommendations (e.g., service, optimization, replacement part recommendations) based on the authority level of the users. For example, a use with an authority level that include purchasing rights may receive a recommendation that recommends buying a replacement part for an obsolete part used in the industrial automation equipment 16. In embodiments where the one or more recommendations are displayed, the recommendations may be displayed as virtual objects overlayed on top of the associated graphical representation of the actual industrial automation equipment 16 in a virtual environment on the display 42, as described in detail below. In some embodiments, the one or more recommendations may be displayed as stand-alone notifications as a list (e.g., outside of the virtual environment) displayed via the display 42. Also, the one or more recommendations may be sent to computing devices being used by certain authorized users (e.g., a person with purchasing authority and/or a sales force team that customizes product offerings for clients).

To illustrate, if a particular machine (e.g., piece of industrial automation equipment 16) is placed offline a number of times that exceeds a threshold during a particular period of time, then the processor 36 may send a recommendation to an authorized purchaser recommending buying a replacement machine. The recommendation may include details with regard to the reasons that the recommendation was generated. In another example, when historical data indicates that a particular piece of industrial automation equipment 16 has been locked out more than an expected number of scheduled lock out times in a certain time period, a recommendation may be sent to a user with authority to replace and/or service the piece of equipment. In yet another example, when a piece of industrial automation equipment 16 has been placed offline more than similar pieces of industrial automation equipment 16 in the same and/or different facility, a recommendation may be sent to a user with authority to replace and/or service the piece of equipment.

The recommendations may include different priority levels that are routed to users with appropriate authority levels. That is, the processor 36 may guide the recommendations to users with an authority level sufficient to address the priority level of the recommendation. For example, a recommendation to replace a part that only has one month of useful life remaining may be assigned a high priority level and/or a recommendation to replace a part that is recalled because of detected faults may be assigned a high priority level. The recommendations with the high priority level may be sent to users with authority levels (e.g., an administrator) that includes permissions to satisfy the recommendation (e.g., purchase the replacement part). That is, when the recommendation recommends purchasing a replacement machine or part, the recommendation may be sent to a computing device 26 operated by a user with an authority level that includes purchasing permissions and may not be sent to a computing device 26 operated by a user without purchasing authority (e.g., a technician that performs procedures). The recommendations may include specific recommendations for part replacement. Also, the recommendations may include proper product handling instructions for the parts that are to be replaced. For example, the product handling instructions may instruct the user to wear particular personal protective equipment (e.g., gloves, goggles, helmet, closed-toed shoes, arc-flash protection) when replacing certain parts.

In some embodiments, the processor 36 may determine that the cause of the particular industrial automation equipment 16 being placed offline and/or locked out more than desired may be remedied by performing preventative maintenance, as opposed to replacing the industrial automation equipment 16 and/or associated parts. For example, certain fasteners may be improperly loosened and causing vibrations of the industrial automation equipment 16 above a threshold. In some embodiments, the threshold value may be learned based on historical data. The vibrations may be the cause of the industrial automation equipment 16 being placed offline. In such a scenario, the processor 36 may determine that tightening the fasteners properly (e.g., preventative maintenance) may alleviate the vibrations instead of replacing a part of the industrial automation equipment 16. As such, the processor 36 may provide a recommendation recommending performing maintenance and/or service on the industrial automation equipment 16 to a computing device 26 operated by a user having authority to perform the maintenance (e.g., a technician).

Figure 6:
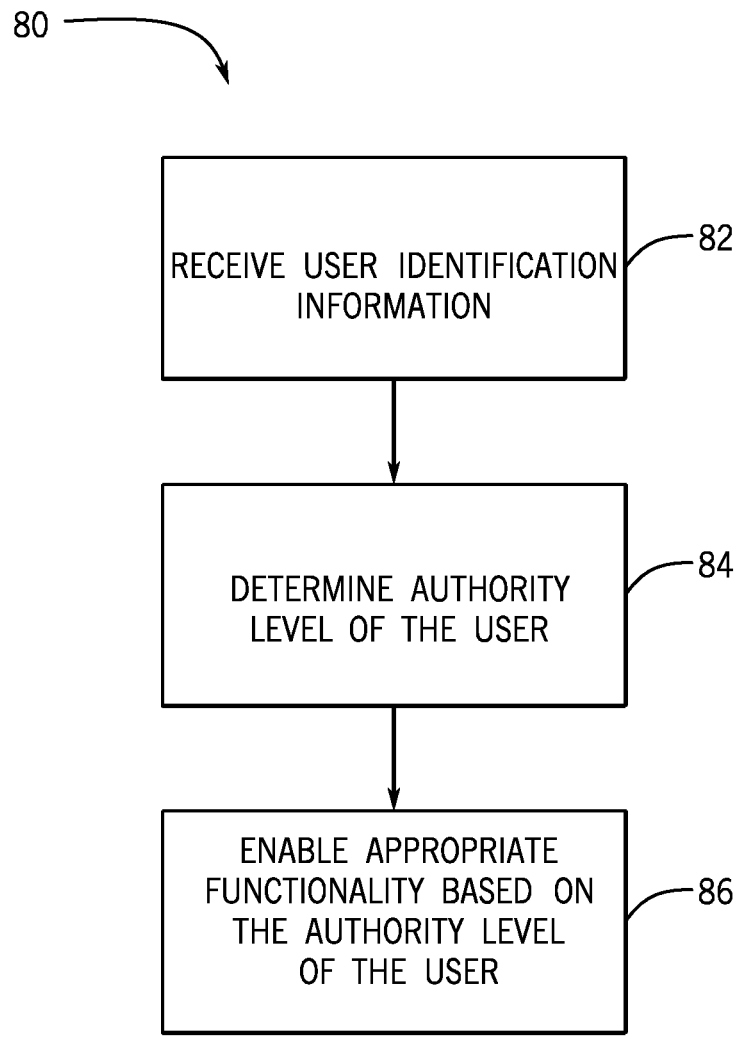
FIG. 6 is a flow diagram of a method for enabling functionality based on an authority level of a user, in accordance with embodiments presented herein.

FIG. 6 is a flow diagram of a method 80 for enabling functionality based on an authority level of a user, in accordance with embodiments presented herein. The method 80 may be implemented as computer instructions stored on the one or more tangible, non-transitory computer-readable mediums (e.g., memories 38) and executable by the one or more processors 36. Although the following description of the method 80 is described with reference to the processor 36 of the computing device 26, it should be noted that the method 80 may be performed by one or more other processors disposed on other devices that may be capable of communicating with the cloud-based computing system 28, the industrial automation equipment 16, or other components associated with the industrial application 24. Additionally, although the following method 80 describes a number of operations that may be performed, it should be noted that the method 80 may be performed in a variety of suitable orders and all of the operations may not be performed. It should be appreciated that the method 80 may be wholly executed by the computing device 26 (e.g., tablet) or the execution may be distributed between the cloud-based computing system 28 and the computing device 26.

Referring now to the method 80, the processor 36 may receive (block 82) user identification information. The user identification information may include image data, audio data, and/or alphanumeric data. For example, the image sensor 44 may capture the image data, which may include a representation of the user's face and the processor 36 may use facial recognition technology to identify the user. Also, the audio sensor 45 may capture the audio data, which may include a representation of the user's voice, breathing, and/or other noises and the processor 36 may use audio processing techniques to identify the user. Further, the user may enter credentials using an input peripheral, such as a touch screen display 42, a keypad, and the like. In yet other embodiments, the image sensor 44 may include a scanner that scans the retinas of the user or the fingerprints of the user to identify the user.

After the processor 36 has determined the identity of the user, the processor 36 may determine (block 84) an authority level of the user. This step may include the processor 36 determining which permissions (e.g., authority level) are associated with the identity of the user in a local database on the memory 38, requesting the cloud-based computing system 28 to determine the permissions associated with the user's identity, or the like. There may be various authority levels with different permissions to perform one or more actions related to the industrial automation equipment 16 associated with each level. The permissions may include editing procedures, adding procedures, removing procedures, taking notes on procedures, replacing the industrial automation equipment 16 or parts of the equipment 16, servicing the equipment 16, purchasing replacement equipment 16 or parts of the equipment 16, and so forth. For example, a first authority level (e.g., administrator) may have more permissions or rights than a second authority level (e.g., operator). The first authority level permissions may enable recording a new procedure using the computing device 26, editing the procedure (e.g., lockout tagout procedure) using the computing device 26, and/or uploading the procedure from the computing device 26 to the cloud-based computing system 28, whereas the second authority level permissions may enable taking notes on the procedures using the computing device 26 and/or uploading the notes from the computing device 26 to the cloud-based computing system 28. Other permissions associated with the first authority level may enable purchasing parts or industrial automation equipment 16. In some embodiments, the first authority level may include all of the permissions of the second authority level, as well as additional permissions that are not granted to the second authority level. It should be noted that there may be many different levels of authority levels and the above-described first and second level are not meant to limit the scope of the disclosure.

The processor 36 may enable (block 86) appropriate functionality of the software that assists users in placing industrial automation equipment offline according to the lockout tagout procedures based on the authority level of the user. For example, the functionality enabled for users with the first authority level may include create, read, update, and delete (CRUD) operations for modifying the procedures presented by the processor 36. On the other hand, if the user has the second authority level, then the functionality that is enabled allowing the user to provide notes on the procedures performed. That is, the functionality enabled with the permissions included in the second authority level may include read operations for viewing the procedures but not creating, updating, or deleting operations for the procedures. Updated procedures, new procedures, and/or notes may be shared between computing devices 26 and/or downloaded from the cloud-based computing system 28. Checking the identity of the user and the authority level of the user may enable the processor 36 to verify that the appropriate user is performing assigned tasks with the computing device 26. For example, the recognized user may be associated with an audit procedure. The audit may include determining whether the lockout tagout procedure is updated. In some cases, the processor 36 may determine that the procedure should be updated and the user's authority level (e.g., first authority level) permits the user to change the procedures (e.g., lockout tagout procedures) being presented on the computing device 26. In some instances, certain procedures (e.g., lockout tagout) may be modified by government regulations or the like and the user with the proper authority level may edit the procedure or record a new procedure and delete the outdated procedure. The updated procedures may be uploaded from the computing device 26 to other computing devices 26 or the cloud-based computing system 28, which may then download the updated or new procedures to other computing devices 26.

Figure 7:
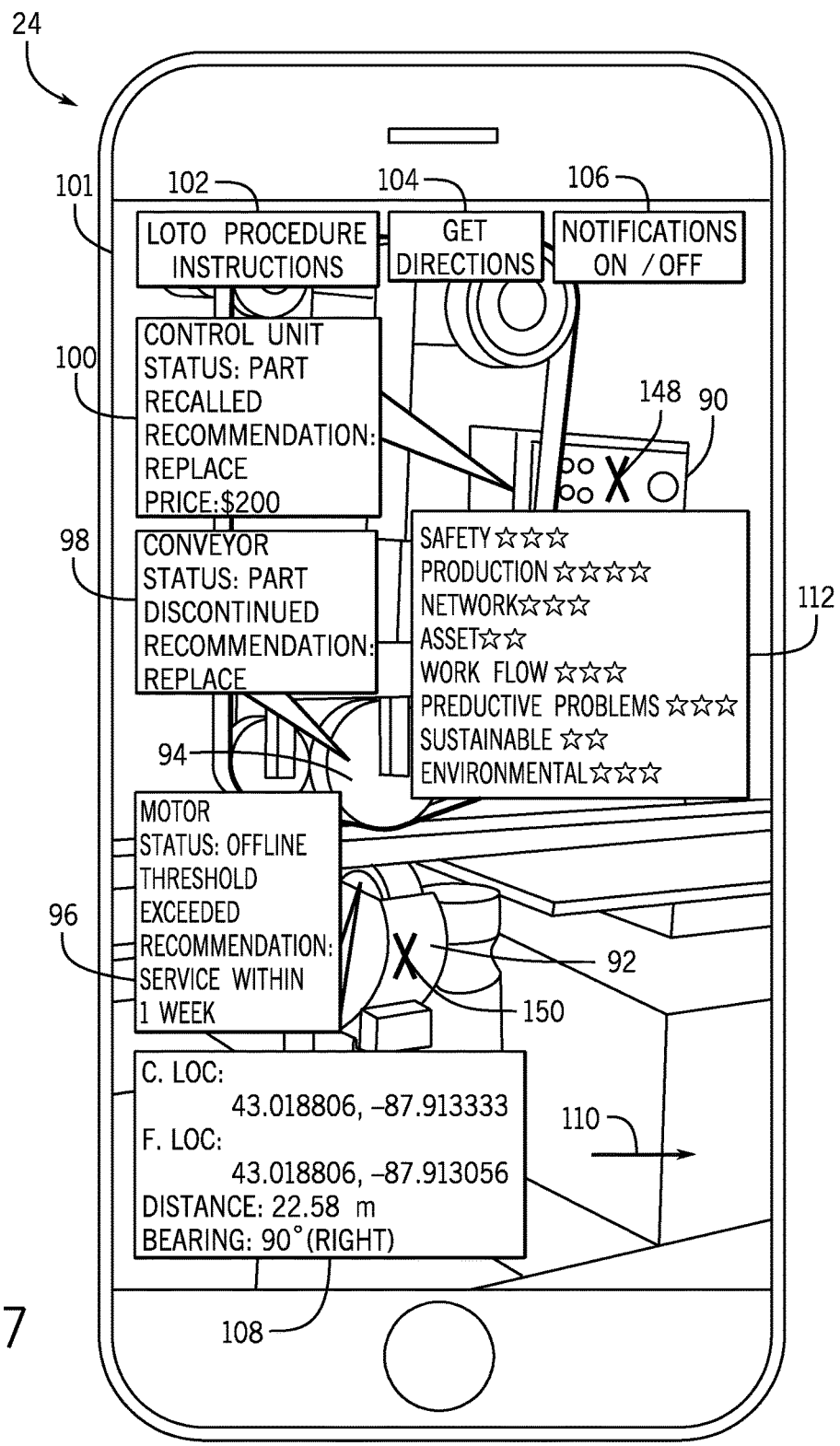
FIG. 7 is a visualization on a smart phone, in accordance with embodiments presented herein.

FIG. 7 is a visualization of the display 101, in accordance with embodiments presented herein. In the depicted embodiment, the display 101 depicts a portion of the facility as real objects, which, in the depicted embodiment, includes a control unit real object 90, a motor real object 92, and a conveyor real object 94. The control unit real object 90, the motor real object 92, and the conveyor real object 94 may be image data capturing a control unit industrial automation equipment 16, a motor industrial automation equipment 16, and a conveyer industrial automation equipment 16, respectively. Accordingly, in some embodiments, the computing device 26 may capture a visual representation used to display the real objects via its image sensor 44. Additionally, in some embodiments, the computing device 26 may receive the real objects from a cloud-based computing system 28 (e.g., a computing device 26) via the communication network 30, for example, based at least in part on the location and orientation of the computing device 26 relative to the facility and/or one or more of the industrial automation equipment 16. That is, the cloud-based computing system 28 may provide real objects to display on the display 101 via additional image sensors disposed throughout the facility.

In addition to the real objects, the display 101 illustrated in FIG. 7 also depicts various virtual objects. More specifically, some virtual objects may be displayed to present relevant information adjacent to a real object representation of corresponding industrial automation equipment 16. For example, in the depicted embodiment, the display 101 displays a visualization including a motor virtual object 96 adjacent to the motor real object 92 with text to indicate the identity, status, and recommendation of the motor. Similarly, the display 101 displays a conveyor virtual object 98 adjacent the conveyor real object 94 with text to indicate the identity, status, and recommendation of the conveyor. Furthermore, the display 101 displays a control unit virtual object 100 adjacent to the control unit real object 90 with text to indicate the identity, status, and recommendation of the control unit.

As described above, the virtual objects may facilitate providing alerts to the appropriate users of recommended actions and/or statuses of the industrial automation equipment 16. For example, the virtual objects may flash certain colors (e.g., green, orange, yellow, red) based on the priority level of the recommendation or status. Additionally, the virtual object may cause an audible sound to be emitted from the computing device 26 based on the priority level of the recommendation or status. As such, the user may be prompted to order the replacement part, service the industrial automation equipment 16, shut down the industrial automation equipment 16 until a replacement part arrives and can be installed, or the like. Further, the display 101 of the virtual environment provides convenience to the user by displaying the real objects 90, 92, and 94 in relation to the computing device 26 so the user can easily find the industrial automation equipment 16 of interest, as described below with reference to the "get directions" functionality. It should be appreciated that the relevant information provided in the virtual objects is merely intended to be illustrative. As such, in other embodiments, the virtual objects may provide other types of relevant information.

Additionally, in the depicted embodiment, the display 101 depicts a lockout tagout (LOTO) procedure instructions button virtual object 102, a get directions button virtual object 104, and a notifications on/off button virtual object 106. More specifically, when the LOTO procedure instructions button virtual object 102 is selected, the computing device 26 may determine LOTO procedure instructions. In some embodiments, the computing device 26 may then present the LOTO procedure instructions as a virtual object. Additionally, the computing device 26 may instruct the industrial automation equipment 16 to execute the LOTO procedure instructions.

Additionally, when the get directions button virtual object 104 is selected, the computing device 26 may determine directions from its current location to a location of a target industrial automation equipment. For example, in the depicted embodiment, a direction virtual object 108 and a bearing virtual object 110 are displayed to facilitate guiding a user to a target location. More specifically, the direction virtual object 108 may include the current location of the computing device 26 and the final (e.g., target) location.

The bearing virtual object 110 and the directions virtual object 108 may also present direction procedure instructions to the user. For example, in the depicted embodiment, the bearing virtual object 110 and the directions virtual object 108 indicate that the user should turn to the right and travel 22.58 meters. As the computing device 26 moves, the directions virtual object 108 and the bearing virtual object 110 may be updated. For example, in some embodiments, the direction steps may be presented in a turn-by-turn manner. In other words, each direction step provided one at a time to track execution. As such, the directions virtual object 108 may provide a next direction step upon completion of a previous direction step until reaching the target location. In addition to directions, as mentioned above, the mobile computing device 26 may indicate a relative location of the target location by an arrow or a pulsating portion of the display 101 to indicate a relative direction of the target location with respect to the image data depicted on the display 101. In addition to the directional information, the virtual object may include information regarding the target location, such as its distance, any relevant information regarding the target location or the industrial automation equipment 16 at the target location or within a vicinity of the target location.

Furthermore, the notifications on/off button virtual object 106 may toggle on or off notification virtual objects. For example, when notification virtual objects are being displayed, selection of the notifications on/off button virtual object 106 may turn the notification virtual objects off. On the other hand, when the notification virtual objects are not being displayed, selection of the notifications on/off button virtual object 106 may turn the notification virtual objects on. In this manner, the displayed virtual objects may be adjusted by the user.

In other embodiments, the user may further adjust what virtual objects are displayed. For example, the user may turn off all virtual objects and only display real objects. Additionally, the user may select what types of virtual objects to display and what type of virtual objects not to display. For example, the user may turn on notification virtual objects and turn off industrial automation equipment virtual objects. In this manner, the user may adjust how display screen space is used.

Virtual objects describing relevant information may be displayed superimposed on real objects representing physical features to facilitate presentation of the relevant information. For example, a computing device may indicate relevant information related to the industrial automation equipment 16 by displaying a virtual object with the relevant information adjacent a real object depicting the industrial automation equipment. In this manner, communication of relevant information may be facilitated by improving presentation of the relevant information.

In some embodiments, the virtual environment shown on the display 101 may include a scorecard virtual object 112 that includes a score for various components of the industrial application 24. For example, the components may include a safety rating, a production level, a network quality, an asset quality, a work flow quality, a predictive problem solving quality, a sustainability rating, and an environmentally friendly rating. As depicted, a graphical representation of the score may include one or more "stars." A range may be used from low to high, where the lowest score may generate one star and the highest score may generate five stars. A unique scorecard virtual object 112 may be generated for each individual real object 90, 92, and 94 and/or an overall scorecard may be generated for the entire industrial application 24.

Figure 8:
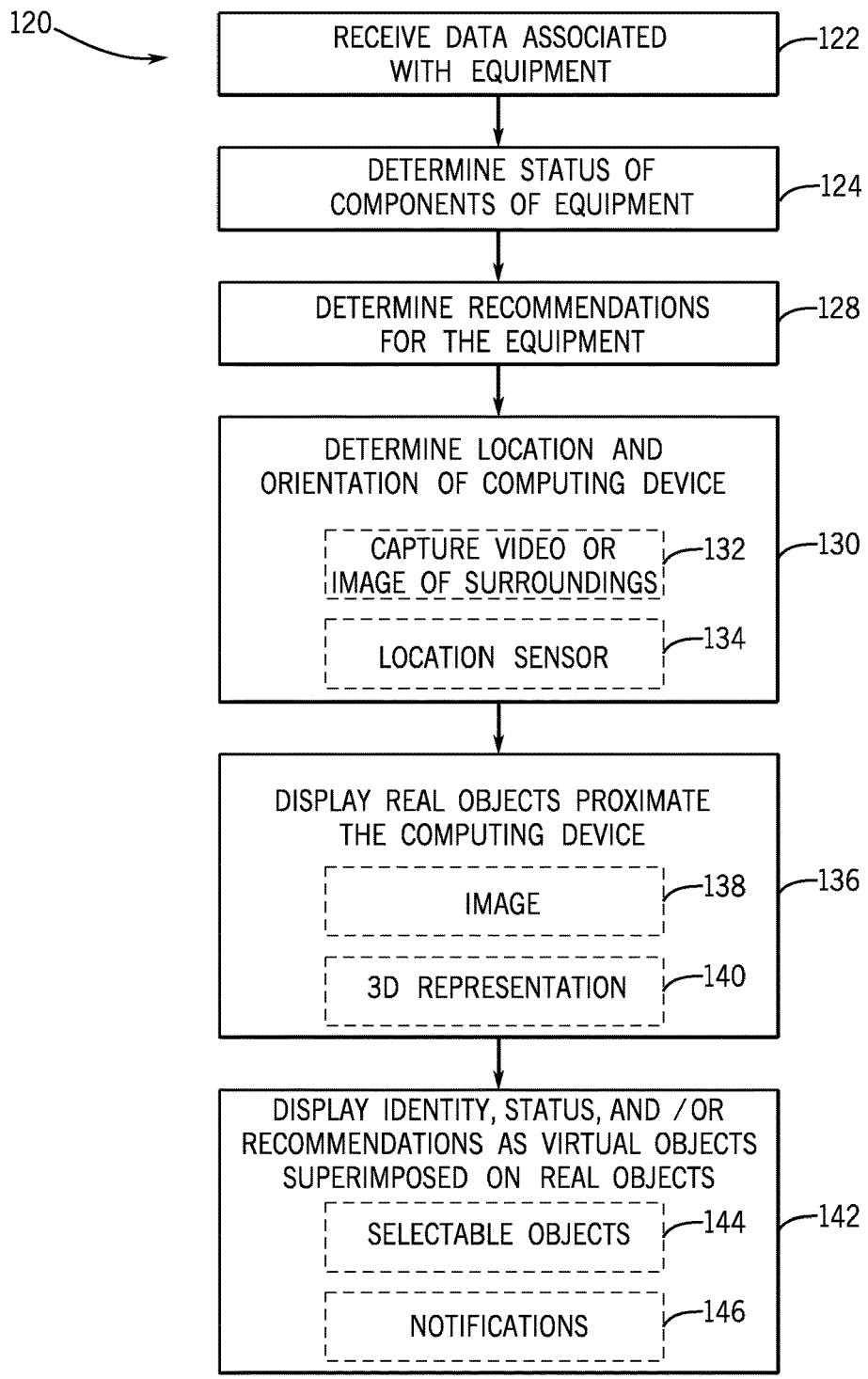
FIG. 8 is a flow diagram describing a method for displaying real objects and virtual objects on the display, in accordance with an embodiment presented herein.

FIG. 8 is a flow diagram describing a method 120 for displaying real objects and virtual objects on the display, in accordance with an embodiment presented herein. The method 120 may be implemented as computer instructions stored on the one or more tangible, non-transitory computer-readable mediums (e.g., memories 37) and executable by the one or more processors 36. Although the following description of the method 120 is described with reference to the processor 36 of the computing device 26, it should be noted that the method 120 may be performed by one or more other processors disposed on other devices that may be capable of communicating with the cloud-based computing system 28, the control/monitoring device 14, the industrial automation equipment 16, or other components associated with the industrial application 24. Additionally, although the following method 120 describes a number of operations that may be performed, it should be noted that the method 120 may be performed in a variety of suitable orders and all of the operations may not be performed. It should be appreciated that the method 120 may be wholly executed by the computing device 26 (e.g., tablet) or the execution may be distributed between the cloud-based computing system 28 and the computing device 26.

Referring now to the method 120, the processor 36 may receive (block 122) data associated with the industrial automation equipment 16. The data may include information related to placing the industrial automation equipment 16 offline, identification information associated with the industrial automation equipment 16, and so forth. The processor 36 may determine (block 124) a status of one or more components of the industrial automation equipment 16. As previously discussed, the processor 36 may use the identity of the industrial automation equipment 16 to query its components statuses using a database stored locally on the memory 38, the cloud-based computing system 28, the Internet, or the like. The statuses may indicate that the particular components of the industrial automation device have been recalled, are obsolete, and/or are discontinued. The processor 36 may determine (block 128) one or more recommendations for the equipment 16 using the data associated with the placing the industrial automation equipment 16 offline, as discussed above, and the statuses of the components of the industrial automation equipment 16 and/or the equipment itself. In some embodiments, the identity, recommendation, and/or status may be presented on the display 101 in the virtual environment as virtual objects, as shown by virtual objects 96, 98, 100 in FIG. 7.

The processor 36 may determine (block 130) its location and its orientation with respect to the facility and/or one or more of the industrial automation equipment 16. In some embodiments, the computing device 26 may determine its location and its orientation based on captured image data (block 132). In some embodiments, the computing device 26 may determine its location and orientation based on data provided by the cloud-based computing system 28 via the communication network 30. The processor 36 may determine physical dimensions, shapes, or other geometrical information regarding physical features captured by the image data. Accordingly, in some embodiments, the processor 36 may determine the location and orientation that would have resulted in the image data. In other embodiments, the computing device 26 may determine its location and orientation using its location sensor 46 (block 134).

The computing device 26 may then depict real objects to visually represent its surroundings. That is, the processor 26 may display (block 136) the real objects proximate to the computing device 26. In some embodiments, the real objects may be based on image data (block 138) capturing the surroundings proximate the computing device 26. For example, the computing device 26 may display a visual representation presently captured by its image sensor 44, in which visual representations of physical features (e.g., the industrial automation equipment 16) are real objects. In other embodiments, the real objects may be based on a previously captured visual representation, such as image data (block 138) or a 3D (three dimensional) representation (block 140).

The processor 36 may display (block 142) the identity, status, and/or recommendations as virtual objects superimposed on the real objects. For example, as described above, computing device 26 may display the motor virtual object 96 with text to indicate the identity, status, and recommendation of the motor; the conveyor virtual object 98 with text to indicate the identity, status, and recommendation of the conveyor automation; and the control unit virtual object 100 with text to indicate the identity, status, and recommendation of the control unit.

However, as depicted, the virtual objects may cover portions of real objects depicted on the display 101. As such, to conserve screen space of the display 48, some virtual objects may be selectably displayed. In some embodiments, virtual objects may be automatically displayed when the computing device 26 is oriented toward a corresponding industrial automation equipment 16 and located within a certain distance from the industrial automation equipment 16. As such, when the user directs the computing device 26, the image data may be transmitted to the cloud-computing system 28, which may determine relevant information to provide various virtual objects to be depicted on the display 101. For example, virtual objects may be added to the display 101 to indicate the relevant information regarding the industrial automation equipment 16 being viewed, such as obsolete parts, maintenance information, and the like. In certain embodiments, the virtual objects may include measurements from devices monitoring the industrial automation equipment 16 such as temperature sensors, pressure sensors, and the like.

Additionally, some virtual objects may be displayed in response to user interaction with a displayed graphical object (e.g., a real object or a virtual object). In other words, some real objects and some virtual objects may be selectable graphical objects (block 144). For example, with regard to screen capture of the display 101 in FIG. 7, the control unit real object 90 may be a selectable graphical object. Accordingly, in response to a selection of the control unit real object 90, the control unit virtual object 100 may be displayed to provide relevant information to the control unit.

The virtual objects may also be selectable graphical objects. In some embodiments, the selectable graphical objects may be notification virtual objects (block 146). Accordingly, returning to the method 120 of FIG. 8, the mobile computing device 26 may display some virtual objects as notification virtual objects. Generally, to conserve display screen space, a notification virtual object may indicate relevant information on a coarse level.

For example, with regard to the screen capture of the display 101 in FIG. 7, a first notification virtual object 148 is superimposed on the control unit real object 90 since the control unit is recalled. Similarly, a second notification virtual object 150 is displayed superimposed on the motor real object 92 since the motor automation has been placed offline more than a threshold number of times within a certain time period. However, to conserve display screen space, the first notification virtual object 148 and the second notification virtual object 150 merely indicate that user attention is desired without providing additional details on the cause. As such, the virtual object 148 may include adding a highlight to the industrial automation equipment 16, pulsating outline of the industrial automation equipment 16, or any other animation effect.

To determine additional detail, the user may select the notification virtual object. For example, in response to a selection of the first notification virtual object 148, the computing device 26 may display the control unit virtual object 100 to indicate that the recalled status of the control unit industrial automation equipment 16. Similarly, in response to a selection of the second notification virtual object 150, the computing device 26 may display the motor virtual object 96 to indicate the overheating status of the motor industrial automation equipment 16.

In other embodiments, the notification virtual objects may take other forms. In some embodiments, different symbols may be used to indicate additional relevant information. For example, the first notification virtual object 148 may be an "R" to indicate that the control unit is recalled (e.g., or an "O" when obsolete, "D" for discontinued) and the second notification virtual object 150 may be a red-cross symbol flame symbol to indicate that the motor industrial automation equipment 92 is in poor health. Additionally, colors may be used to indicate additional relevant information. In some embodiments, notification virtual objects may be displayed to change the perceived color of real objects. For example, a heat map may be provided by using notification virtual objects to adjust perceived color of the real objects based on temperature of the corresponding industrial automation equipment 16.

It should be noted that the methods 50, 80, and 120 are performed using the processor 36 that is part of the computing device 26. The computing device 26 is configured to execute instructions that enable the device to interact with the industrial automation equipment 16. As such, the computing device 26 is tied to particular machines to assist in the management and operations of the industrial automation equipment 16, and thus, the industrial application 24. Moreover, it should be noted that the data received by the computing device 26, the cloud-based computing system 28, the industrial automation equipment 16, or the control/monitoring device 14 may be transformed when being transmitted, analyzed, or depicted for view by a user of the respective device. For example, the historical data associated with placing the industrial automation equipment 16 offline may be transformed into one or more virtual objects including a recommendation and/or status that is displayed in a virtual environment. Also, the directions generated to the various industrial automation equipment 16 include a transformation of location data signals to navigational directions.

Technical effects of the embodiments described herein include improving communication of relevant information in an industrial automation system. More specifically, communication may be facilitated by determining relevant information (e.g., recommendations, statuses, or the like) based at least one historical data associated with placing the industrial automation equipment 16 offline. Large amounts of data and equipment available in today's electronically advanced society make it difficult to assess certain statuses efficiently and present embodiments facilitate equipment assessment and modification via automated analysis and recommendation to appropriate users. Additionally, communication of relevant information may be facilitated by improving presentation of the relevant information. By improving communication of relevant information, operations and maintenance of the industrial automation system may be performed more efficiently.

In the preceding specification, various embodiments have been described with reference to the accompanying drawings. It will, however, be evident that various modifications and changes may be made thereto, and additional embodiments may be implemented, without departing from the broader scope of the present disclosure as set forth in the claims that follow. The specification and drawings are accordingly to be regarded in an illustrative rather than restrictive sense.

The invention claimed is:

1. A tangible, non-transitory computer-readable medium comprising computer instructions stored thereon, wherein the computer instructions, when executed by a processor, are configured to cause the processor to:
receive historical data associated with placing a machine in an industrial environment offline;
determine an authority level of a plurality of users requesting to place the machine offline;
determine one or more recommendations for the machine, one or more parts of the machine, or both based on the historical data and the authority level;
control a display to present the one or more recommendations according to the authority level of the plurality of users; and
enable a subset of the plurality of users to perform a subset of a plurality of actions associated with the one or more recommendations based on the historical data and a respective authority level of a respective user of the subset of the plurality of users, wherein the plurality of actions comprises creating a first set of procedures based on the respective user having a first authority level, reading a second set of procedures based on the respective user having a second authority level lower than the first authority level, updating the first set of procedures or the second set of procedures based on the respective user having the first authority level, deleting the first set of procedures or the second set of procedures based on the respective user having the first authority level, and providing notes on the first set of procedures or the second set of procedures based on the respective user having the second authority level, wherein the first set of procedures or the second set of procedures comprises an audit procedure, a lockout tagout procedure, a device offline procedure, a component replacement procedure, a service/maintenance procedure, or a combination thereof.

2. The computer-readable medium of claim 1, wherein determining the one or more recommendations for the machine, the one or more parts of the machine, or both based on the historical data comprises:
determining whether the machine has been placed offline more than a first threshold number of times within a certain time period;
determining whether the machine has been locked out more than a second threshold number of times within a certain time period;
receiving other historical data associated with placing one or more other machines in the industrial environment offline, wherein the one or more other machines are similar to the machine; and
determining whether the machine has been placed offline or locked out more than the one or more other machines within a certain time period.

3. The computer-readable medium of claim 2, wherein the computer instructions, when executed by the processor, are configured to cause the processor to learn the first threshold number of times, the second threshold number of times, or both, based on the historical data.

4. The computer-readable medium of claim 1, wherein the one or more recommendations comprise a recommendation to service the machine or the one or more parts, a recommendation to further optimize performance of the machine or the one or more parts by increasing production, reducing energy consumption, or both, a recommendation to replace the machine or the one or more parts, a price quote for a replacement machine or part, or some combination thereof.

5. The computer-readable medium of claim 1, wherein the computer instructions are configured to cause the processor to:
retrieve status information related to the machine, the one or more parts, or both, wherein the status information indicates whether the machine, the one or more parts, or both are recalled, discontinued, obsolete, or some combination thereof; and
display the status information.

6. The computer-readable medium of claim 5, wherein the computer instructions that cause the processor to display the one or more recommendations, the status information, or both are configured to cause the processor to:
capture a visual representation of a portion of a facility comprising the machine as image data;
display a first real object configured to visually represent physical features of the machine in the portion of the facility based at least in part on the image data; and
display a first virtual object superimposed on at least a portion of the first real object based at least on the one or more recommendations, the status information, or both for the machine, the one or more parts, or both.

7. The computer-readable medium of claim 5, wherein the first authority level is associated with a permission level that grants purchasing permissions when the machine, the one or more parts, or both are recalled, discontinued, obsolete, or some combination thereof, to the respective user, wherein the one or more recommendations includes a notice of the status information, a recommendation to replace the machine, the one or more parts, or both, and proper handling instructions.

8. The computer-readable medium of claim 1, wherein the computer instructions are configured to cause the processor to send the one or more recommendations to the respective user based on a priority level of the one or more recommendations and the respective authority level of the respective user.

9. The computer-readable medium of claim 1, wherein the computer instructions are configured to cause the processor to display the one or more recommendations to the respective user with the first authority level that grants purchasing permissions when the one or more recommendations recommend purchasing a replacement machine or one or more replacement parts.

10. The computer-readable medium of claim 1, wherein the first authority level is indicative of a permission to perform a second subset of the plurality of actions different than the second authority level.

11. The computer-readable medium of claim 1, wherein the instructions are configured to:
receive user identification information associated with the respective user;
determine the respective authority level of the respective user based on the user identification information; and
enable functionality based on the respective authority level of the respective user, wherein the functionality comprises creating the lockout tagout procedure, reading the lockout tagout procedure, updating the lockout tagout procedure, deleting the lockout tagout procedure, or some combination thereof.

12. A method, comprising:
  receiving, via a processor, historical data associated with placing a machine in an industrial environment offline;
  determining, via the processor, an authority level of a plurality of users requesting to place the machine offline;
  determining, via the processor, one or more recommendations for the machine, one or more parts of the machine, or both based on the historical data and the authority level;
  sending, via the processor, the one or more recommendations to the plurality of users based on the authority level of each user of the plurality of users; and
  enabling, via the processor, a subset of the plurality of users to perform a subset of a plurality of actions associated with the one or more recommendations based on the historical data and a respective authority level of a respective user of the subset of the plurality of users, wherein the plurality of actions comprises creating a first set of procedures based on the respective user having a first authority level, reading a second set of procedures based on the respective user having a second authority level lower than the first authority level, updating the first set of procedures or the second set of procedures based on the respective user having the first authority level, deleting the first set of procedures or the second set of procedures based on the respective user having the first authority level, and providing notes on the first set of procedures or the second set of procedures based on the respective user having the second authority level, wherein the one or more procedures comprise an audit procedure, a lockout tagout procedure, a device offline procedure, a component replacement procedure, a service/maintenance procedure, or a combination thereof.

13. The method of claim 12, wherein determining the one or more recommendations for the machine, the one or more parts of the machine, or both based on the historical data comprises:
  determining, via the processor, whether the machine has been placed offline more than a first threshold number of times within a certain time period;
  determining, via the processor, whether the machine has been locked out more than a second threshold number of times within a certain time period;
  receiving, via the processor other historical data associated with placing one or more other machines in the industrial environment offline, wherein the one or more other machines are similar to the machine; and
  determining, via the processor, whether the machine has been placed offline or locked out more than the one or more other machines within a certain time period.

14. The method of claim 13, comprising learning, via the processor, the first threshold number of times, the second threshold number of times, or both, based on the historical data.

15. The method of claim 12, wherein the one or more recommendations comprise a recommendation to service the machine or the one or more parts, a recommendation to further optimize performance of the machine or the one or more parts, a recommendation to replace the machine or the one or more parts, a price quote for a replacement machine or part, or some combination thereof.

16. The method of claim 12, comprising:
  retrieving status information related to the machine, the one or more parts, or both, wherein the status information indicates whether the machine, the one or more parts, or both are recalled, discontinued, obsolete, or some combination thereof; and
  sending the status information to one or more users of the plurality of users based on the authority level of the one or more users.

17. The method of claim 16, comprising displaying the one or more recommendations, the status information, or both by:
  capturing a visual representation of a portion of a facility comprising the machine as image data;
  displaying a first real object configured to visually represent physical features of the machine in the portion of the facility based at least in part on the image data; and
  displaying a first virtual object superimposed on at least a portion of the first real object based at least on the one or more recommendations, the status information, or both for the machine, the one or more parts, or both.

18. An electronic device, comprising:
  a processor configured to:
    receive historical data associated with placing a machine in an industrial environment offline;
    determine an authority level of a plurality of users requesting to place the machine offline, wherein the authority level grants one or more permissions to perform one or more actions related to the machine;
    determine one or more recommendations for the machine, one or more parts of the machine, or both based on the historical data and the authority level;
    controlling a display to present the one or more recommendations based on the authority level of the plurality of users;
    enable a subset of the plurality of users to perform a subset of a plurality of actions associated with the one or more recommendations based on the historical data and a respective authority level of a respective user of the plurality of users, wherein the plurality of actions comprises creating a first set of procedures based on the respective user having a first authority level, reading a second set of procedures based on the respective user having a second authority level lower than the first authority level, updating the first set of procedures or the second set of procedures based on the respective user having the first authority level, deleting the first set of procedures or the second set of procedures based on the respective user having the first authority level, and providing notes on the first set of procedures or the second set of procedures based on the respective user having the second authority level, wherein the first set of procedures or the second set of procedures comprises an audit procedure, a lockout tagout procedure, a device offline procedure, a component replacement procedure, a service/maintenance procedure, or a combination thereof.

19. The electronic device of claim 18, wherein determining the one or more recommendations for the machine, the one or more parts of the machine, or both based on the historical data comprises:
  determining whether the machine has been placed offline more than a first threshold number of times within a certain time period;
  determining whether the machine has been locked out more than a second threshold number of times within a certain time period;
  receiving other historical data associated with placing one or more other machines in the industrial environment offline, wherein the one or more other machines are similar to the machine; and determining whether the machine has been placed offline or locked out more than the one or more other machines within a certain time period.

20. The electronic device of claim 19, wherein the processor is configured to learn the first threshold number of times, the second threshold number of times, or both, based on the historical data.

21. The electronic device of claim 18, wherein the one or more recommendations comprise a recommendation to service the machine or the one or more parts, a recommendation to further optimize performance of the machine or the one or more parts by increasing production, reducing energy consumption, or both, a recommendation to replace the machine or the one or more parts, a price quote for a replacement machine or part, or some combination thereof.

22. The electronic device of claim 18, wherein the processor is configured to:

retrieve status information related to the machine, the one or more parts, or both, wherein the status information indicates whether the machine, the one or more parts, or both are recalled, discontinued, obsolete, or some combination thereof; and display the status information.

23. The electronic device of claim 22, wherein displaying the one or more recommendations, the status information, or both comprises:

capturing a visual representation of a portion of a facility comprising the machine as image data;

displaying a first real object configured to visually represent physical features of the machine in the portion of the facility based at least in part on the image data; and displaying a first virtual object superimposed on at least a portion of the first real object based at least on the one or more recommendations, the status information, or both for the machine, the one or more parts, or both.

* * * * *